(12) United States Patent
Hlady et al.

(10) Patent No.: US 7,578,562 B2
(45) Date of Patent: Aug. 25, 2009

(54) GRAIN HOPPER

(75) Inventors: Tim Hlady, Coaldale (CA); Robert Kennedy, Calgary (CA); William Oliver, Lethbridge (CA); James W Spenceley, Lethbridge (CA)

(73) Assignee: Flexa Hopper Plastics Ltd., Lethbridge (CA)

( * ) Notice: Subject to any disclaimer, the term of this patent is extended or adjusted under 35 U.S.C. 154(b) by 313 days.

(21) Appl. No.: 11/424,007

(22) Filed: Jun. 14, 2006

(65) Prior Publication Data

US 2007/0056875 A1    Mar. 15, 2007

(51) Int. Cl.
 *B65D 88/26* (2006.01)
(52) U.S. Cl. ........................................................ 298/24
(58) Field of Classification Search ................... 298/24, 298/25, 26, 4, 3; D12/101; D15/13; 206/518; 220/86.1
See application file for complete search history.

(56) References Cited

U.S. PATENT DOCUMENTS

| | | | | |
|---|---|---|---|---|
| 2,299,702 A | * | 10/1942 | Mosel | ......................... 220/553 |
| D279,323 S | | 6/1985 | Spenceley | |
| 5,127,740 A | * | 7/1992 | DeBoer | ......................... 366/2 |
| D367,071 S | * | 2/1996 | McKay | ......................... D15/27 |
| 5,964,566 A | | 10/1999 | Stewart et al. | |
| 2002/0092799 A1 | * | 7/2002 | Storruste | ..................... 209/460 |

OTHER PUBLICATIONS

Grain Augers—Bin Unload Systems www.grainaugers.com/bin_unload_systems.html?print+1; accessed Sep. 15, 2005.
GSI Grain BIns; www.telcoweb.net/northern/grain_bins.htm; accessed Sep. 15, 2005.
Power Sweep Bin Unloaders from Springland; www.skywaygrain.com/ bin-unloaders.html; accessed Sep. 15, 2005.
Bin unloaders Hopper Style Power Head Bin Unloader, www.twister.ca/bin_unloaders.htm; accessed Sep. 15, 2005.
nasd Grain auger safety reminders; www.cdc.gov/nasd/docs/d001601-d001700/d00648/d001648...; accessed Sep. 15, 2005.
The University of Iowa; Man dies after getting his leg caught in a grain auger—Iowa; www.public-health.uiowa.edu/face/reports/report-016.html; accessed Sep. 15, 2005.

* cited by examiner

*Primary Examiner*—H Gutman
(74) *Attorney, Agent, or Firm*—Sean W. Goodwin

(57) ABSTRACT

A hopper for transferring granular materials has a unique composite shape which enables accommodation of the safety guard of an auger and access about a back of the hopper. A wedge-shaped base permits pivoting of the hopper to adjust to the angle of the auger used to remove the material, minimizing the angle of the auger and maximizing extraction of material from the hopper.

24 Claims, 18 Drawing Sheets

GRAIN HOPPER

FIELD OF THE INVENTION

The present invention relates generally to hoppers used for transfer of granular materials from one location to another. More particularly, a hopper having a stable base is configured to accept an auger at a low repose while accommodating an auger safety guard.

BACKGROUND OF THE INVENTION

Standalone augers are known for receiving free-flowing granular materials, such as those pouring from bins and chutes or dumped from end-dump trucks. The hoppers are positioned below the source. Further, a transfer auger is positioned in the hopper to elevate accumulated granular materials to a destination such as bin or other storage location.

Hoppers have a number of competing design issues including structural integrity, accommodation of augers, minimizing of auger angle, minimizing of hopper height while maximizing capacity, stability and minimizing material hang-up.

Clearly what is required is a hopper which meets all of the competing design issues and which permits substantially 100% evacuation of granular materials therefrom without requiring manipulation of the auger therein or removal of the safety guard therefrom so as to prevent injury to the operator.

SUMMARY OF THE INVENTION

Figure 1:
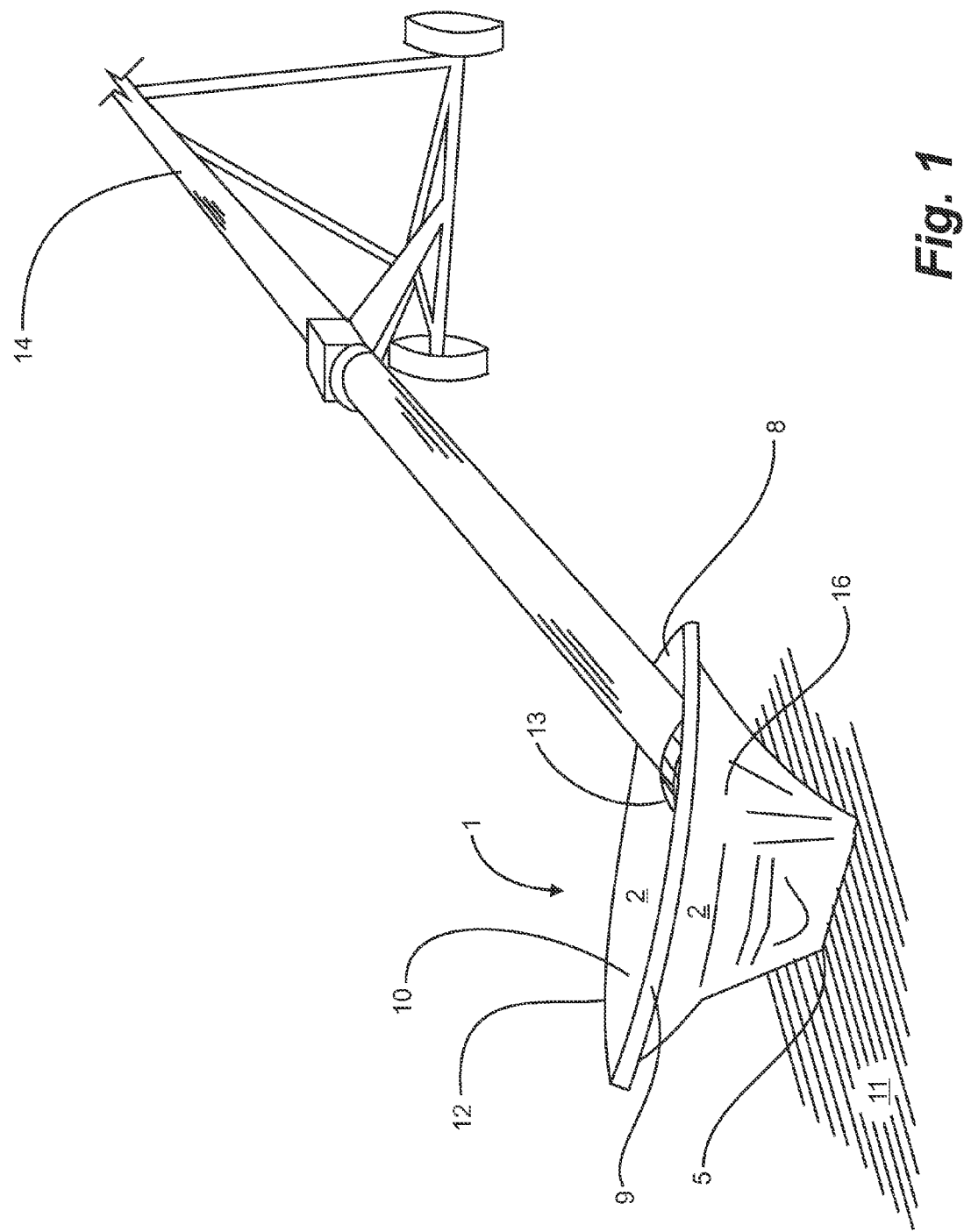
FIG. 1 is a perspective view of a hopper according to one embodiment of the invention illustrated with an auger positioned therein and extending at about a 25-30 degree angle therefrom.

An open top hopper is provided for the transfer of granular materials in the hopper, such as grain, by a screw conveyor or auger. The chamber defined by the walls of the open top hopper has a composite shape and an elongated open top.

In one embodiment, the open top has an elongated shape preferably approximated by the merger of a semi-circular shape and a trapezoidal shape when viewed in plan. In three dimensions, the hopper walls comprise a combination of a cross-section of a right conical portion wherein the sectioned base of the cone forming the semi-circular portion of the open top, and a tetrahedron forward or front wall portion. A further transitional wall portion can merge the two shapes therebetween. The back and front walls form the entirety of the side walls of the hopper. The elongated shape is adapted to receive an auger which can access the bottom of the hopper and yet extend from the hopper at a shallow angle.

The front wall is distended outwardly forming a protrusion which extends beneath and partially along the auger. The protrusion forms an annular space about the auger for accommodating an auger guard which extends circumferentially thereabout. Augers with safety guards can be used with this hopper.

The hopper is completed with a base portion which is merged into the conical and tetrahedron portions and which is relatively wide side-to-side to provide lateral stability and yet is narrow front-to-back to permit rotation of the hopper to align with the angle of the auger which resides therein during transfer operations.

The composite shape has a generally oblique conical shape wherein the vertex or apex of the cone is oriented at the bottom of the hopper and a nominal center of the open top of the hopper is misaligned perpendicularly from the apex, the nominal center of the open top being offset to the front of the hopper enabling a shallow discharge angle of the auger. Further, a saddle can be formed in the front wall at the lip for further lowering the auger angle and securing the auger in the hopper.

The unique shape of the hopper provides strength, access by loading equipment about the back wall, accommodation of safety guards and the ability to rotated the auger about the bottom while permitting the inlet end of the auger to be maintained in the bottom of the hopper for maximum evacuation of material therefrom. Cages or guards which normally protect a screw portion at the inlet end of the auger need not be removed, and are less likely to be removed by operators, thus improving the safety of the transfer operations.

Therefore in a broad aspect, a hopper for the transfer of granular materials, is supported at a base and adapted to receive and support an inlet end of an auger in a bottom of the hopper, the hopper comprising: a conical-shaped, semi-circular back wall having an open top, an open front face and a bottom apex at a bottom of the open front face; a three dimensional tetrahedral-shaped front wall having an open top, an open back face and a bottom apex at a bottom of the open back face, the open front face, open back face and bottom apexes merging at a base for forming a composite profile adapted for receiving the inlet end of the auger at the bottom and adapted for funneling granular material to the inlet end of the auger, the hopper being supported on the base.

In another embodiment, the base is wedge-shaped being relatively wide from side-to-side to provide lateral stability and being narrow from to back to permit angular rotation of the hopper angularly about the base so as to conform to the angle of the auger while maintaining the inlet end in the bottom for maximum evacuation of the granular material from the hopper.

In another embodiment, the hopper further comprises a triangular transitional side wall portion between the back walls of the semi-circular back portion and the front wall of the tetrahedral front portion, the tetrahedron forming a upward rising triangular trough which supports the auger thereon. An angular bottom of the trough can be widened in the form of a protrusion which provides space for accommodating the auger and the guard and further can aid in material flow to the inlet end of the auger.

In another embodiment, a lip is formed about the open top to provide stiffening of the hopper walls but yet permit yielding when contacted by a point load or force. Further, circumferential ribs, typically triangular in shape, are formed about the girth of the hopper to provide structural stability.

DETAILED DESCRIPTION OF THE PREFERRED EMBODIMENT

As shown in FIG. 1, a hopper 10 rests on a surface 11 such as the ground. The hopper 10 is generally concave, having hopper walls 2 forming a chamber 1 with an open top 12 for receiving granular materials, such as grain, and directing the granular material downward along the incline of the walls 2 to a bottom 5 of the hopper 10. For the removal of the granular materials, the hopper 10 is adapted to receive an inlet end 13 of an elongate screw conveyor or auger 14.

Figure 16A:
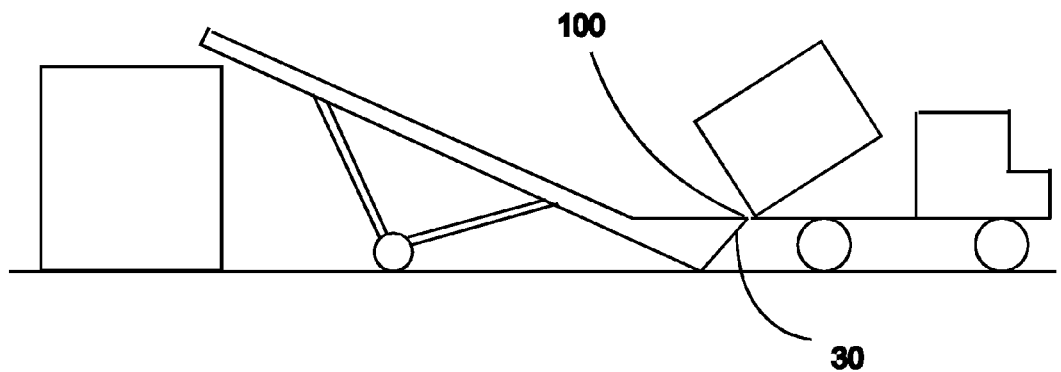
FIGS. 16a and 16b are elevation and top view respectively of a typical arrangement of an auger in a grain hopper and with a truck dumping grain into the hopper.

The auger 14 is adapted to extend from an inlet end 13, residing adjacent a bottom 5 of the hopper 10, and upwardly through the open top 12 at a front 8 of the hopper 10, and extends therefrom for maximal evacuation of grain, typically directed at an elevated destination, such as a truck or a bin (FIG. 16a).

Figure 3:
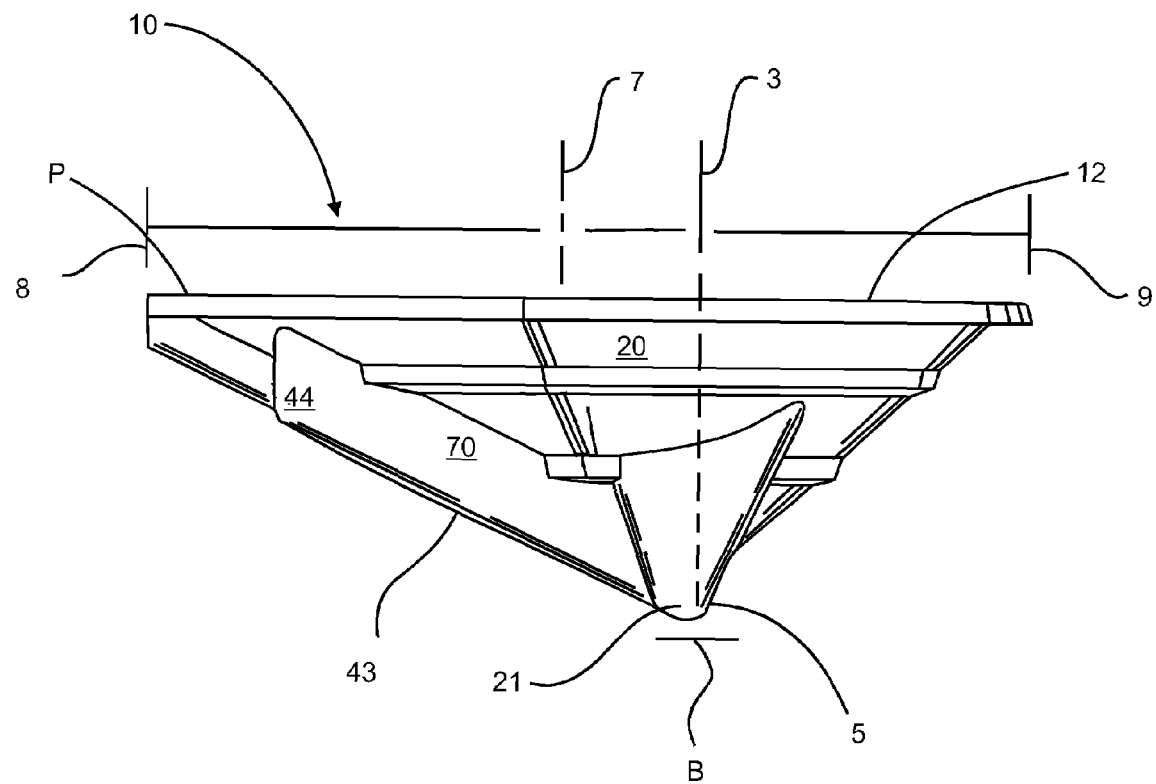
FIG. 3 is a side view of the hopper of FIG. 1.
Figure 11:
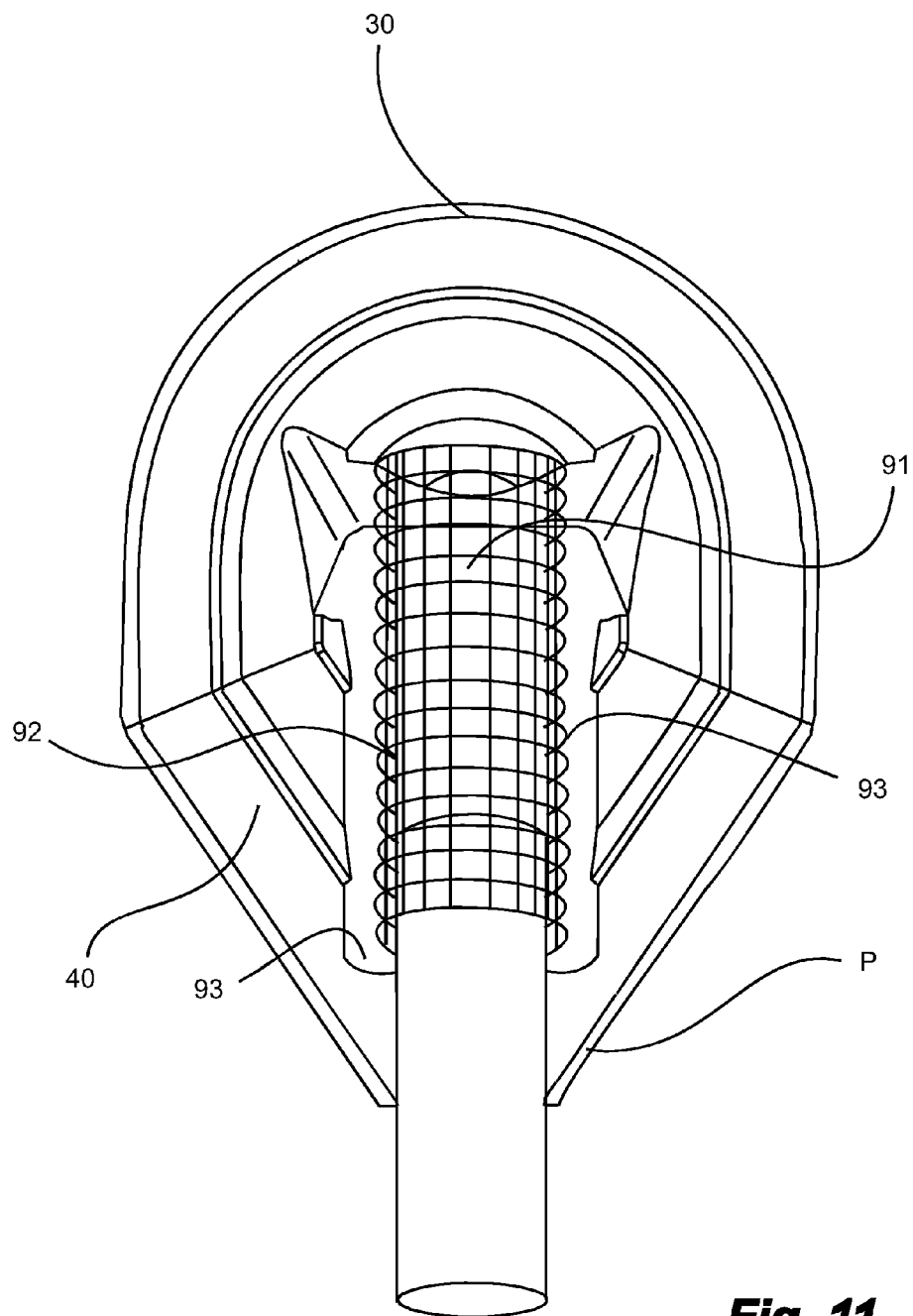
FIG. 11 is a top view of the hopper with the auger positioned therein.
Figure 12:
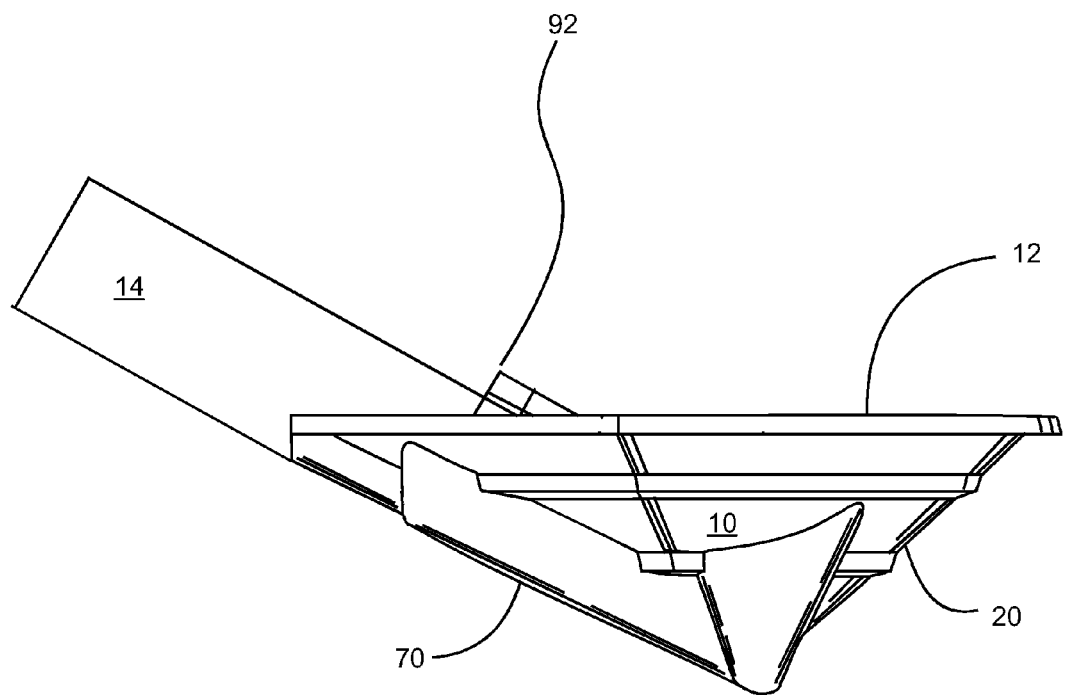
FIG. 12 is a side view of the hopper with the auger positioned therein.

With reference also to FIGS. 3 and 11, a front wall 44 of the hopper 10 can distend outwardly for forming a protrusion 70, the protrusion 70 forming an annular space 93 about the auger 14 for accommodating a circumferential guard 92 which typically extends circumferentially about the auger 14.

Figure 2:
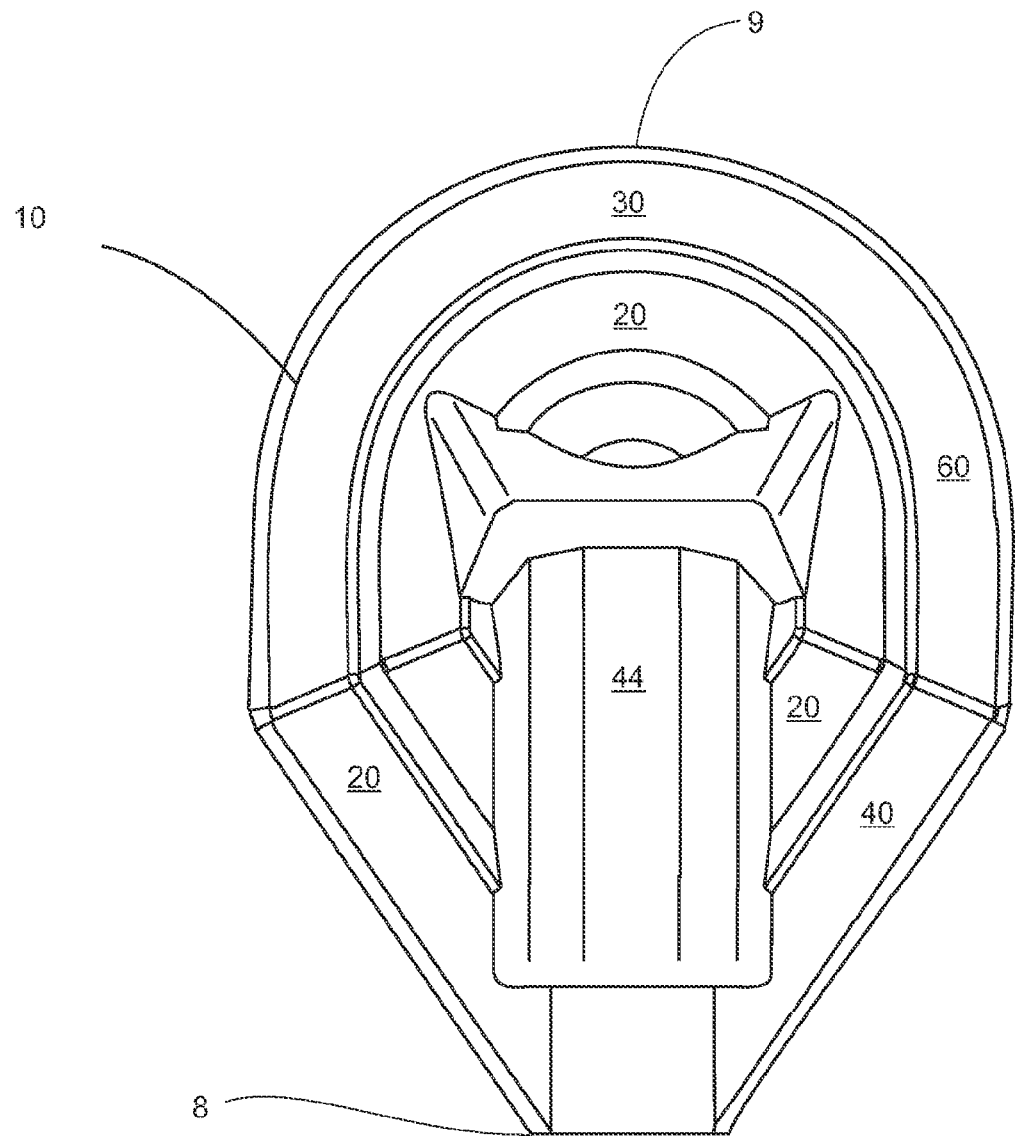
FIG. 2 is a top view of the hopper of FIG. 1.

Having reference to FIGS. 1-3, the hopper 10 can have a generally oblique conical shape wherein the vertex or apex 3 of the oblique cone shape is oriented at the bottom 5 of the hopper 10 and a nominal center 7 of the open top 12 of the hopper is not aligned perpendicularly from the apex 3. The open top 12 has an elongated shape. The nominal center 7 of the open top 12 is offset towards a forward end or front 8 of the hopper 10. As a result, the incline of the walls 2 of the hopper from the front 8 to the apex 3 is less steep than is the incline of a back 9 of the hopper 10 to the apex 3.

Figure 6:
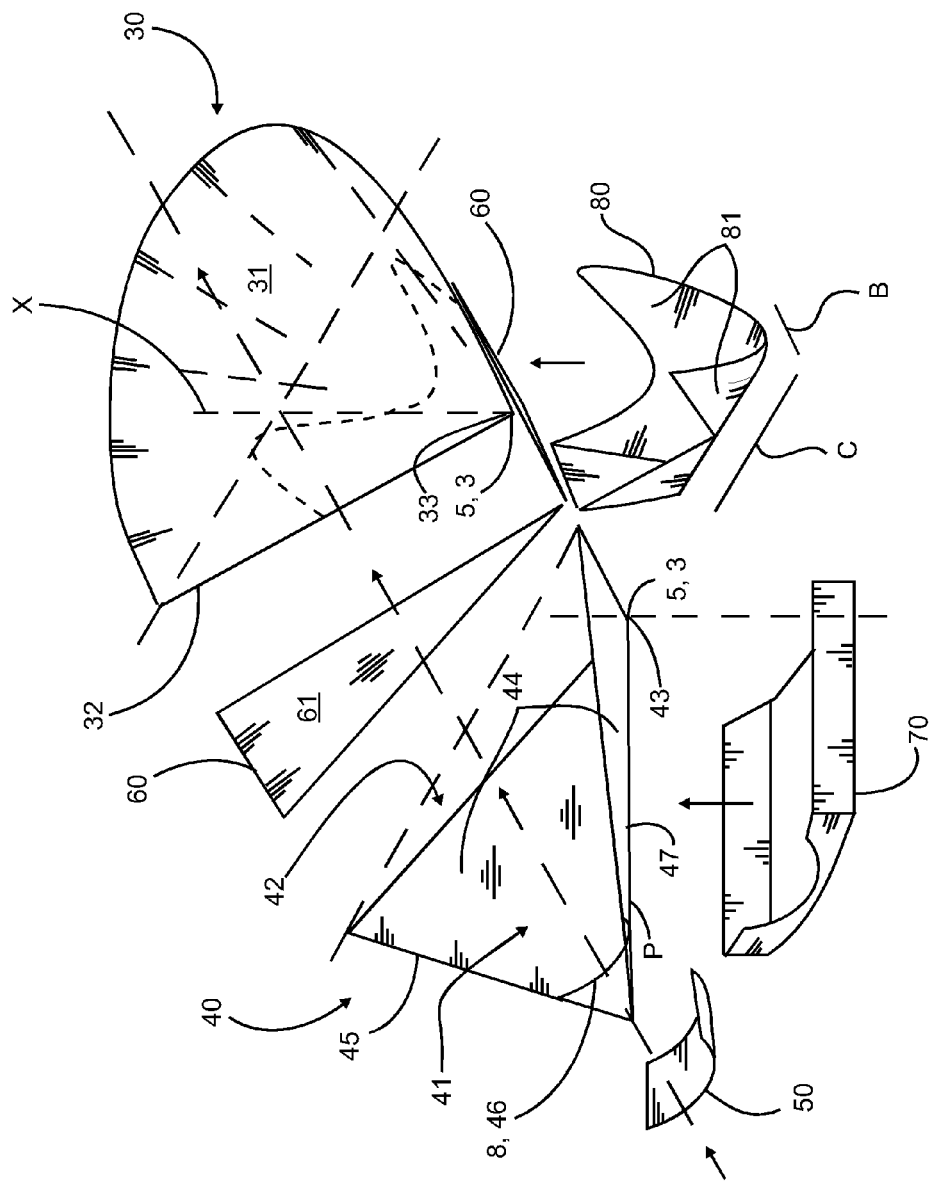
FIG. 6 is an exploded, isometric front view of the hopper of FIG. 5 illustrating some of the 3-D profiles constituting the hopper structure.

As shown in FIGS. 2-6, the hopper 10 has a composite shape. Referring to FIGS. 2 and 6, the hopper 10 is generally conical with side walls 2 diverging upwardly from the bottom 5 to the open top 12. In embodiments of the invention, the hopper 10 disclosed herein has a configuration which deviates from a simplistic conical shape and other known profiles of conventional hoppers.

With reference to FIGS. 1, 3, 4 and 5 the hopper 10 is supported on the ground 11 on a hopper base 21 (FIG. 13a) having a front-to-back profile B and a side-to-side profile C.

In FIG. 3, viewed from the side and perpendicular to the longitudinal axis of the auger 14 (removed for clarity), the hopper 10 illustrates a narrow front-to-back base profile B for enabling rotation of the hopper 10 to adapt to the angle of the auger 14. From the front view of FIG. 4, the hopper 10 has a relatively wide side-to-side profile C, providing lateral stability and to resist tipping. The hopper base 21 forms the bottom 5 of the hopper 10 and forms a chute for funneling granular materials to the auger 14.

With reference to FIG. 6, the side walls 2 of the hopper 10 are a merger of at least two major three-dimensional wall profiles; a first three dimensional semi-conical profile 30 and a second three-dimensional (3-D) tetrahedron profile 40. Viewed in plan view (FIGS. 2 and 11), the result of the merging of the profiles 30,40 is a chamber 1 having a generally elongate open top 12, the nominal center 7 being offset to a front 8 of the hopper 10.

The first or semi-conical profile 30 is a cross-section of a right semi-circular conical portion 30 for forming back wall 31 of the hopper 10 having a forward facing and open front face 32 straddled by the back wall 31. The conical portion 30 has a central axis X extending upwardly from about a bottom apex 3.

The second profile or tetrahedron profile 40 is a generally trigonal pyramid or tetrahedral-shaped portion 40 having substantially triangular side walls 44 forming a triangular V-trough 45 oriented forwardly. The side walls 44 of the V-trough 45 rise upwardly laterally and forwardly from a bottom edge 47 and diminish in height forwardly to the open top 12, forming a prow P. The V-trough 45 has an open top 41 and a back-facing open back face 42 which is straddled by the front wall 44. The front wall 44 of the V-trough 45 at the open back face 42 forms a wide back or stern which merges with the back wall 31 of the open front face 32 of the semi-circular back side 31. A bottom apex 43 of the V-trough 45 is oriented at the bottom 5.

The V-trough 45 is truncated at the front to form a narrow front edge 46 at the open top 12 from which the auger 14 protrudes. Preferably a semi-circular rest 50 is provided at the front edge 46 for conforming to and supporting the auger 14 at the open top 12 of the hopper 10.

The hopper front and back walls 44, 31 at the merger of the open back and front faces 42,32 can include a third trapezoidal or substantially triangular or transitional profile or profiles 60 which merges the semi-circular 30 and tetrahedron 40 portions and forms connecting side walls 61. The connecting walls 61 extend generally along a tangent from the back walls 31, through the third substantially triangular profile 60 to intersect with the side walls 44 triangular V-trough 45.

The triangular V-trough 45 is widened through a fourth profile or protrusion 70 for increasing annular spacing 93 between the auger inlet end 13 and the hopper 10. As shown in FIG. 11, the front wall 44 or V-trough 45 of the hopper 10 can distend outwardly and laterally forming the protrusion 70 which extends from about the hopper bottom 5 and partially along the front wall 44 for forming an annular space 93 about the auger 14. The annular space accommodates the guard 92 and minimizes any incentive by an operator to remove the guard to clear more granular material.

A fifth prism or wedge-shaped base portion 80 completes the bottom of the hopper structure and forms the hopper base 21 at the bottom 5. The base portion 80 is narrow across base profile B to permit angular rotation of the hopper 10 and is wide along base profile C to stabilize the hopper 10 laterally. The base portion 80 has side walls 81 which intersect and merges with the semi-circular profile 30 and tetrahedral portion 40. The side walls 81 have steep angle of inclination for funneling granular materials to the inlet end of the auger.

Figure 4:
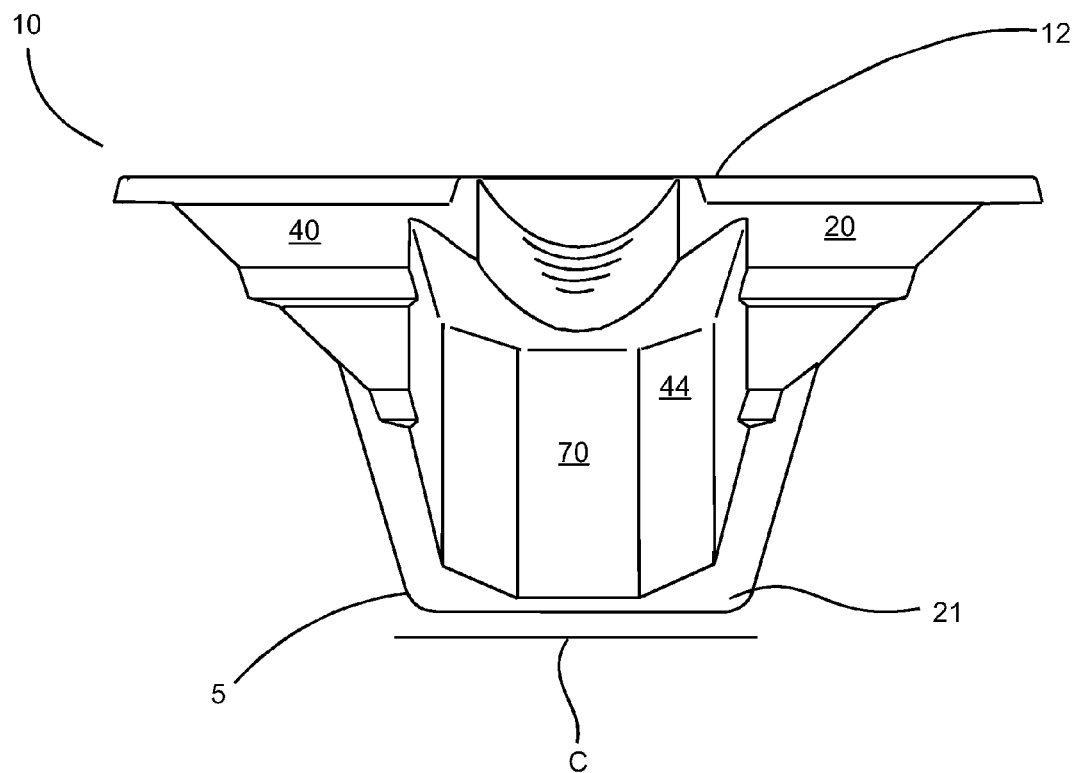
FIG. 4 is a front view of the hopper of FIG. 1.
Figure 5:
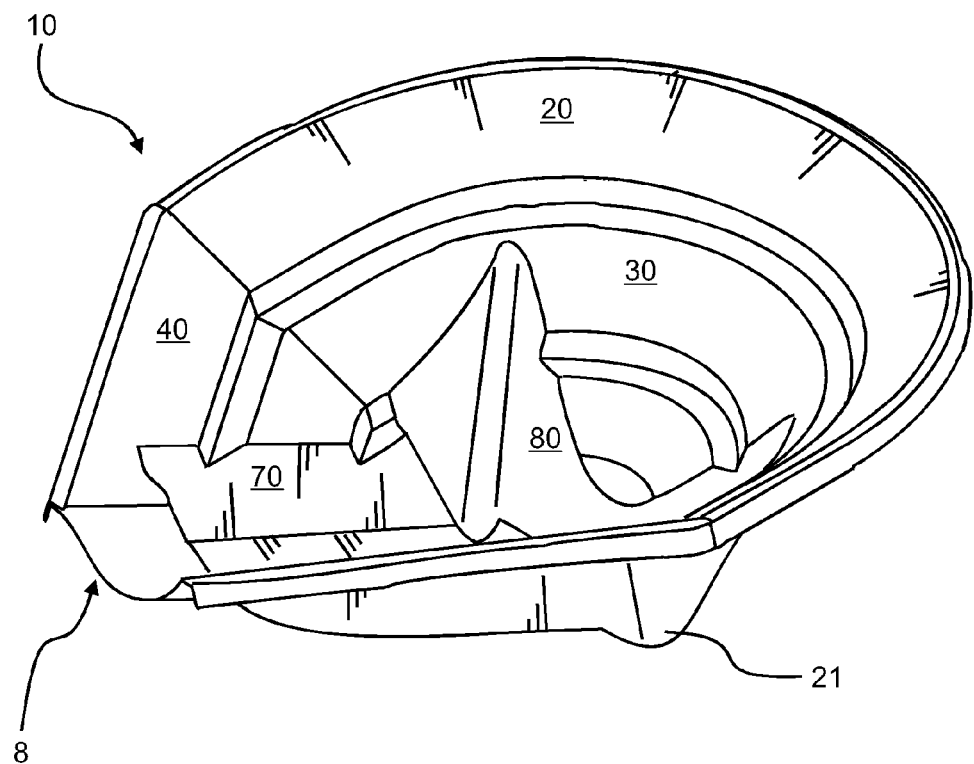
FIG. 5 is an isometric front view of the hopper of FIG. 1.
Figure 7:
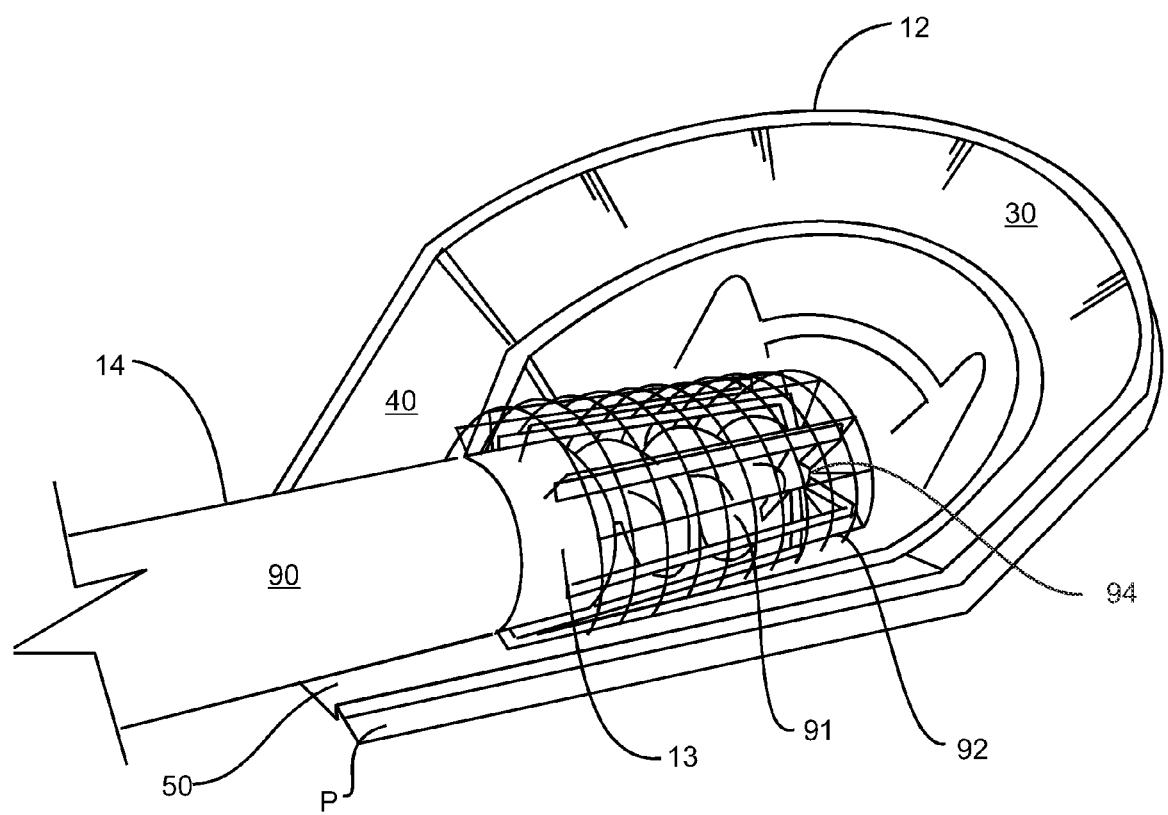
FIG. 7 is a perspective front view of the hopper with the tail or inlet end of the auger positioned therein with the guard in its normal installed configuration.
Figure 8:
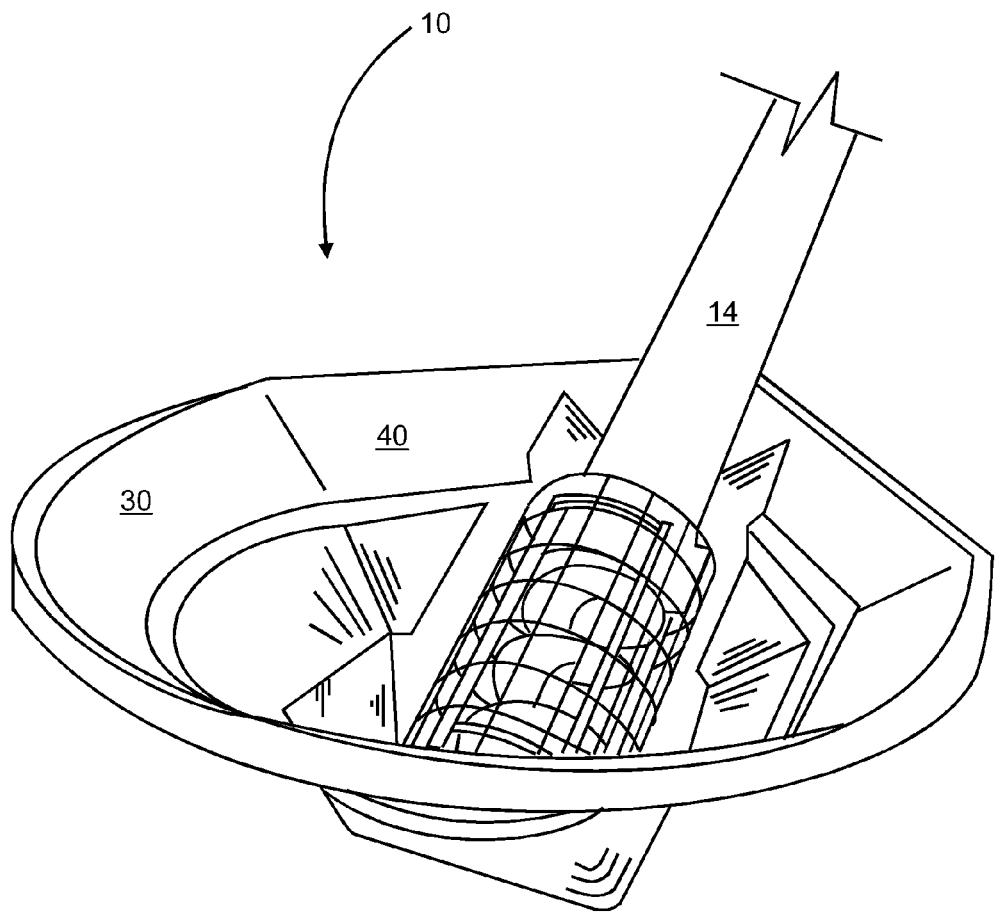
FIG. 8 is a perspective back view of the hopper with the tail or inlet end of the auger positioned therein.

As shown in FIG. 7, the auger 14 is a cylindrical tube 90 with a screw 91 extending coaxially within. The screw 91 protrudes from the cylindrical tube 90 at the inlet end 13 and is supported by a tail bearing 94 which is typically cantilevered from the cylindrical tube 90. A circumferential cage or guard 92 surrounds the inlet end 13 between the tail bearing 94 and the tube 90 to exclude personnel from the screw 91 yet enable passage of granular material to the screw 91. As shown in FIGS. 2, 4 and 6, the V-trough 45 along the edge 47 is widened to form the protrusion 70 which is a semi-circular or rectangular trough bottom having a nominal radius greater than that of the auger 14 so as to form the annular space 93 therebetween and aid grain flow into the inlet end 13.

The front wall 44 can be formed with one or more pairs of auger straddling slots therethrough for enabling cinch straps to pass around the auger tube 90 and be cinched or otherwise secured to the hopper 10. Each pair of slots can be spaced at differing angular positions for accommodating different sized augers 14.

Figure 9:
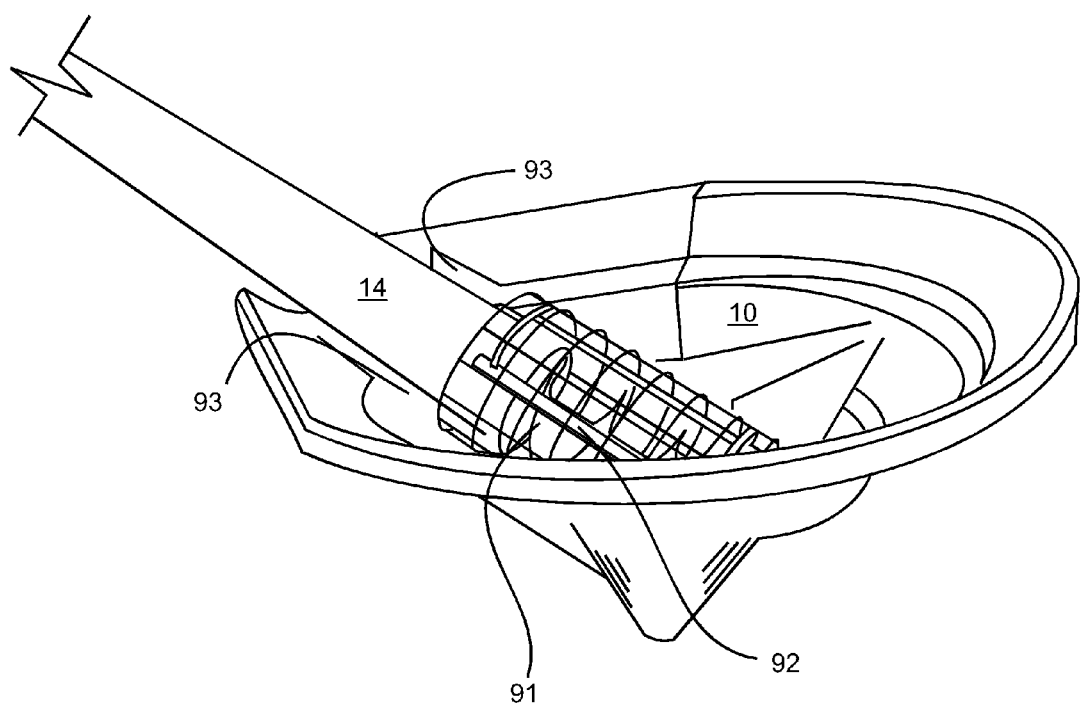
FIG. 9 is a perspective back side of the hopper with the tail or inlet end of the auger positioned therein.
Figure 10:
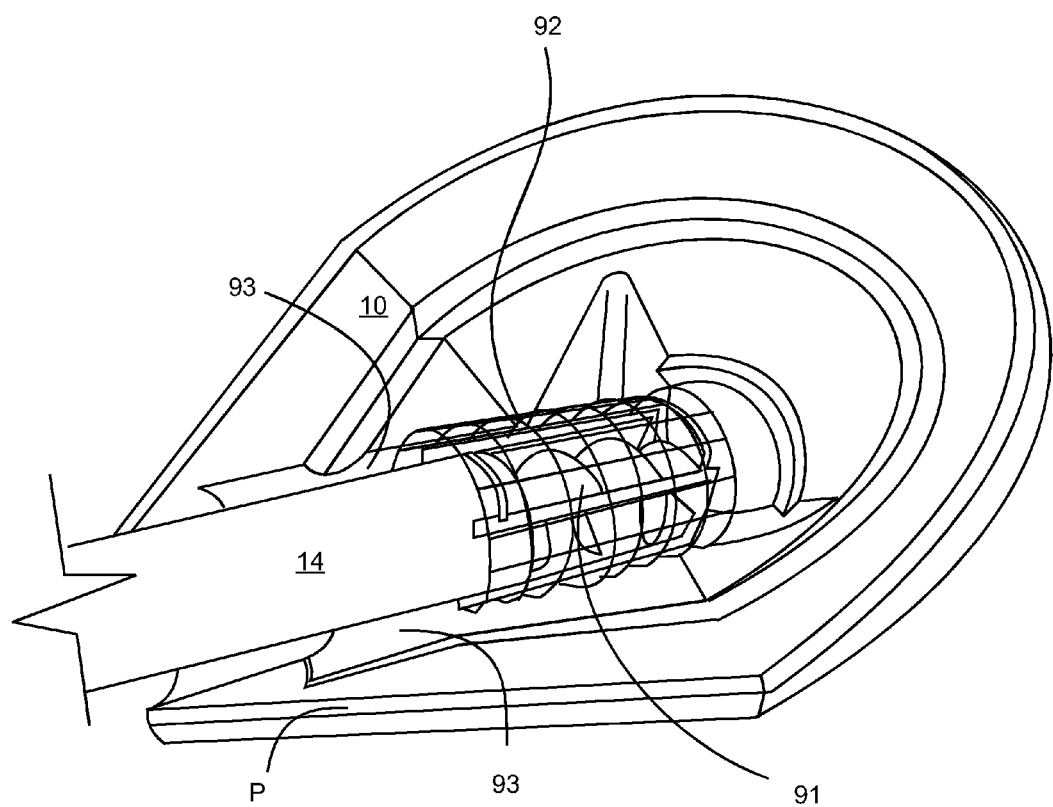
FIG. 10 is a perspective top view of the hopper with the tail or inlet end of the auger positioned therein.

FIGS. 7-15 illustrate a variety of views to show the relationship of the various features and configurations of the hopper 10 and how it adapts to accommodate the auger 14. As shown in FIGS. 9 and 10, the tip of the prow P is blunted or formed by the inclusion of the semi-circular rest 50 which is sized to support the cylindrical tube 90 of the auger 14 and maintain the annular space 93 in the protrusion 70 under the auger inlet 13.

Figure 13A:
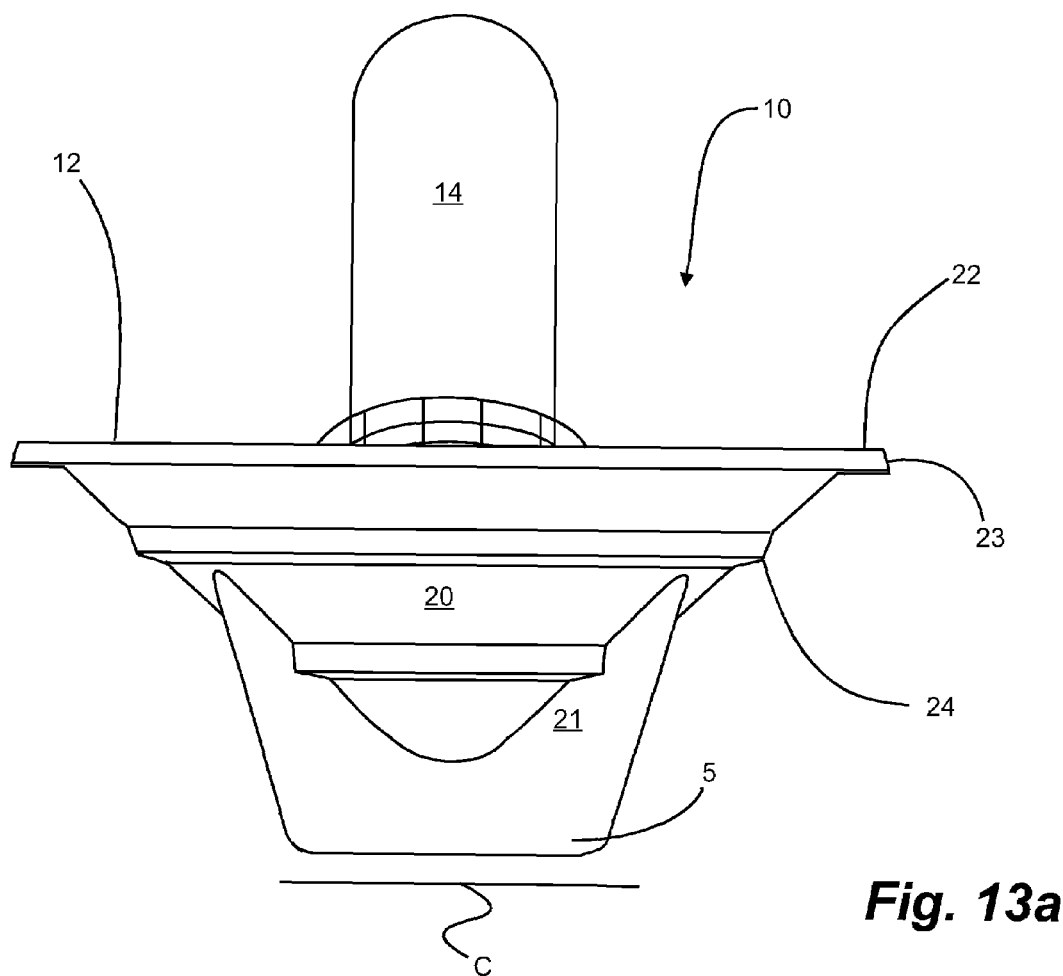
FIG. 13a is a back view of the hopper with the auger extending from the front.
Figure 13B:
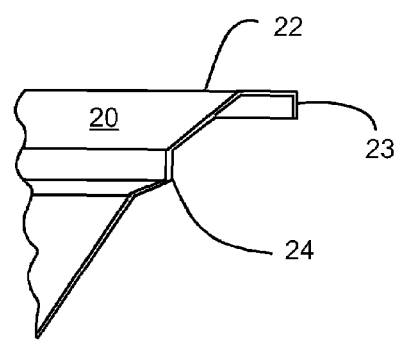
FIG. 13b is a cross-sectional view of the lip of the upper edge of the hopper.

Best seen in FIGS. 13a and 13b, a stiffening lip 23 is formed about the open top 12. The stiffening lip 23 is forgiving and will yield in the face of a point force or forceful deformation from impact and displacement, such as from encroachment of a truck box or other immovable structure thereon which might occur during operations such as unloading. The lip 23 is extends about substantially the entire open top 12 along an upper edge 22 of the side walls 2 formed by the semi-circular portion 30, the tetrahedral portion 40 and the transitional portion 60. The lip 23 first extends laterally outwards from the side walls 2 and then downwardly to a terminal edge. Further, as best seen in FIG. 13b, circumferential ribs, or ribbed projections 24, preferably of obtuse triangular cross-section, circumscribe a girth of the hopper 10 for imparting increased strength and structural stability to the side walls 2.

Figure 14:
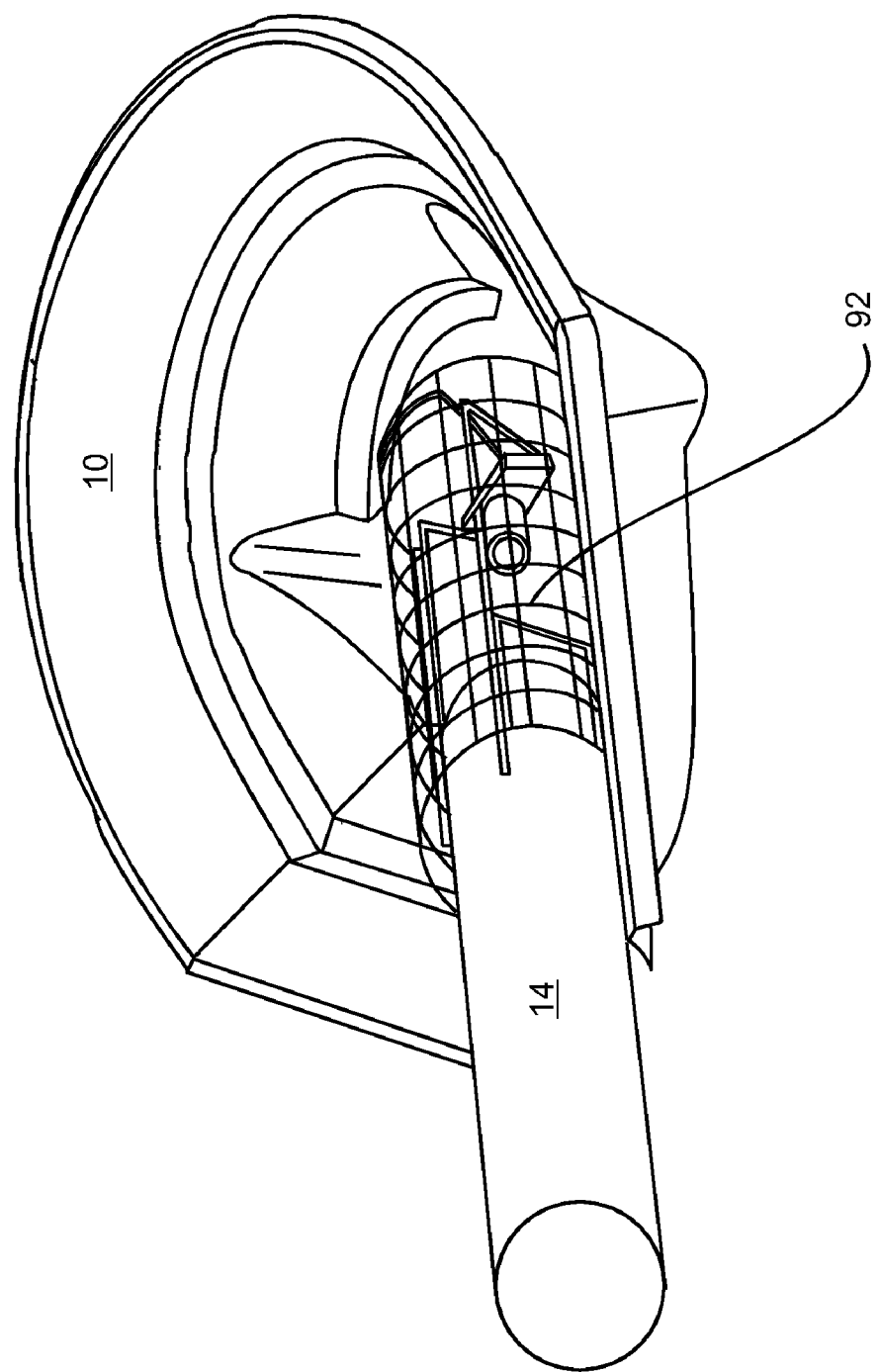
FIG. 14 is a perspective front view of the hopper with the auger guard and screw in place.
Figure 15:
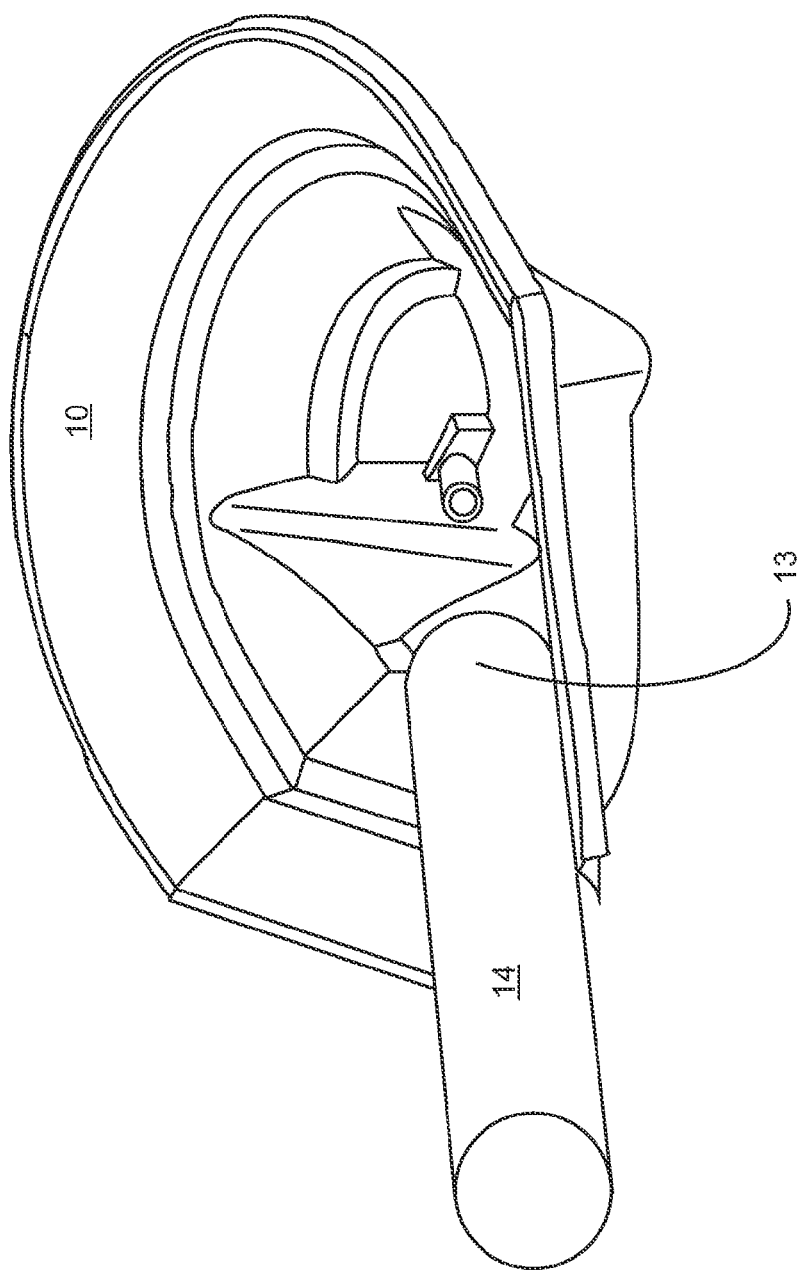
FIG. 15 is a perspective front view of the hopper according to FIG. 14, with the auger tube protruding from the front and with the guard and screw shown removed for illustrating the inlet end.

FIGS. 14 and 15 illustrate the inlet end 13 of the auger 14 with and without the guard 92. The screw 91 has been removed to better illustrate the spatial relationship between the hopper 10 and the auger 14. The tail bearing 94 is shown positioned in close proximity to the base portion 80 adjacent the bottom 15.

Figure 16B:
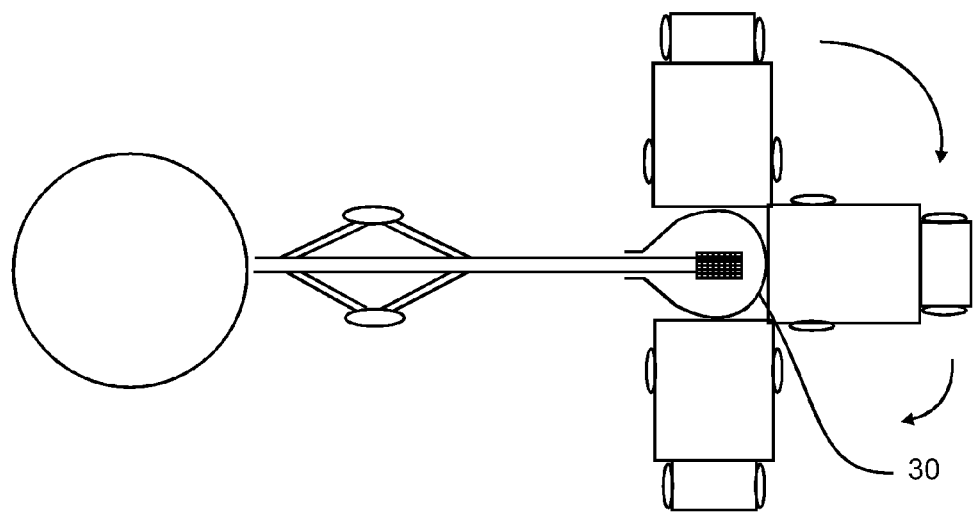

As shown in FIGS. 16a and 16b, the semi-circular back side portion 30 is amenable to easy access by the source of the granular material, such as by the tailgate of the grain truck 100, from over about 270 degrees or at least three sides of the hopper 10. The tetrahedron profile of the front of the hopper is strong. The aforementioned configurations of the hopper 10 enable low auger angles for maximal grain recovery and minimal residuals or loss when the hopper 10 is emptied. The combination of the semi-circular and tetrahedron portions 30,40 results in a strong hopper structure with a large volume or capacity.

Figure 17A:
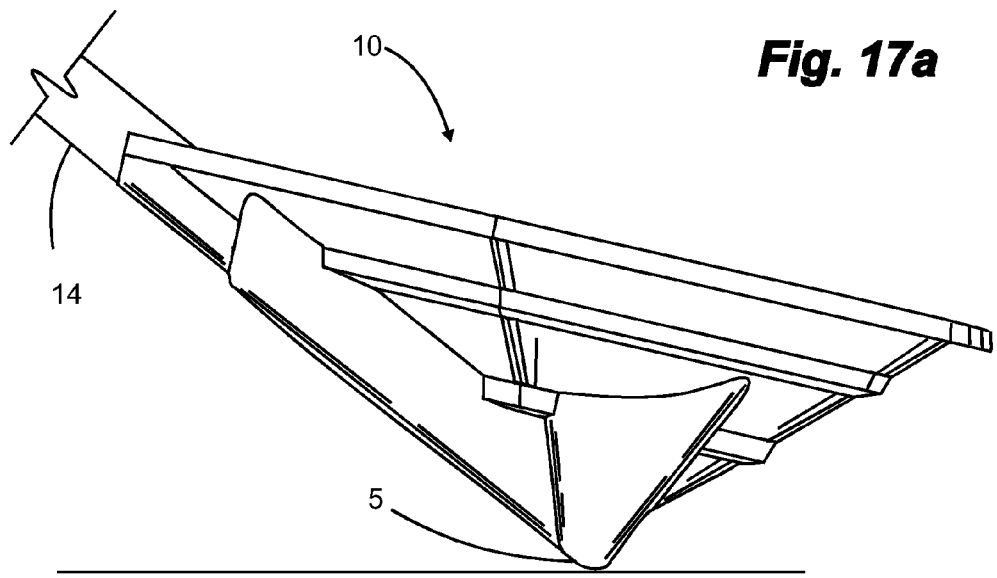
FIGS. 17a and 17b are elevation views illustrating rotation of the hopper about the base to accommodate augers at different angles.
Figure 17B:
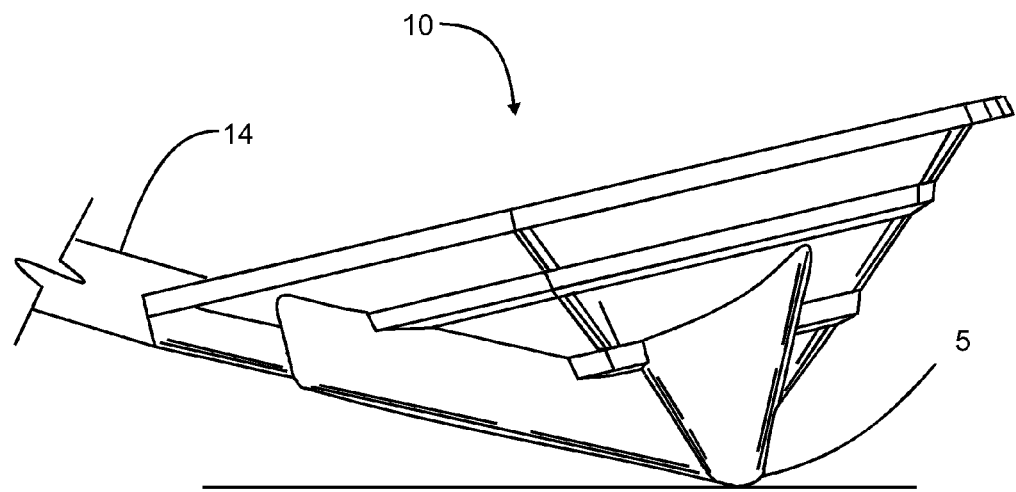

As shown in FIGS. 17a-17b, the hopper 10 can pivot about the narrow transverse base profile B to conform the angle of the hopper side wall 2 to the angle of the auger 14. The shallower the angle of the auger 14, the more the hopper 10 will rotate to accommodate the auger 14.

Figure 18:
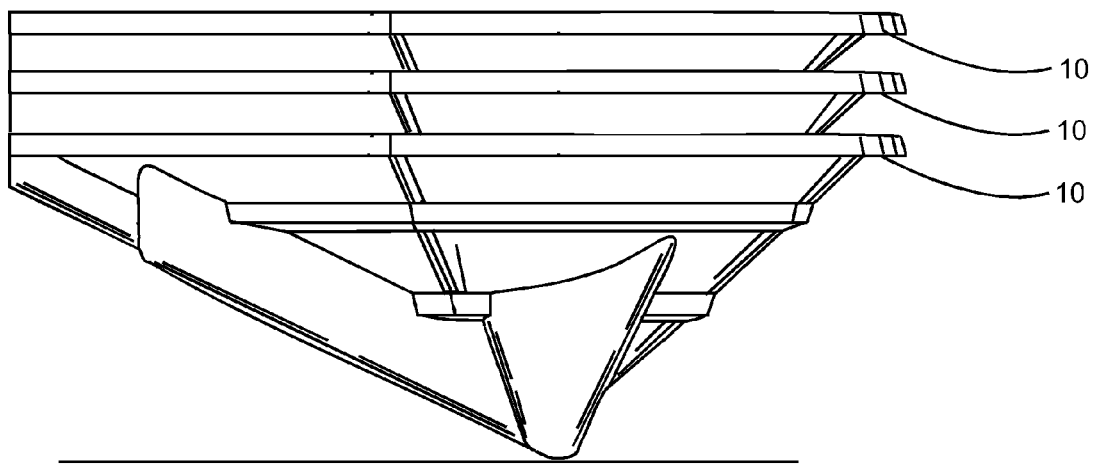
FIG. 18 is an elevation view of a plurality of hoppers according to FIG. 1 stacked in nested arrangement for transport.

As shown in FIG. 18, the hopper 10 is stackable in nested arrangement for minimizing shipping volumes with up to 20% more hoppers 10 per shipment. For most applications, hopper diameters can be sized to about ½ of a maximal transport width enabling two-wide shipping arrangements for even greater shipping economies.

Further, the height of the open top 12 of the hopper 10 from the supporting surface or ground can be minimized for increasing the number of applications in which the hopper 10 can be used.

The wide triangular V-trough 45 and protrusion 70 ensures that augers 14 can be used with the original guards 92 in place, thereby improving safety.

Long augers 14, typically having angles of about 25-30 degrees are currently available and can be accommodated by rotation of the hopper 10 about the hopper base 21.

The embodiments of the invention in which an exclusive property or privilege is claimed are defined as follows:

1. A hopper for the transfer of granular materials, adapted to receive and support an inlet end of an auger in a bottom of the hopper, the inlet end having a guard thereabout, the hopper comprising:
    a generally conical chamber having side walls, an open top and a bottom of the hopper, the bottom of the hopper adapted to receive the inlet end of the auger, the auger extending from the inlet end and over a front wall of the hopper;
    a protrusion in the front wall for forming an annular space about the auger portion for accommodating the guard; and
    a base at a hopper apex at a back and the bottom of the hopper for supporting the hopper, the base being relatively wide from side-to-side to provide lateral stability and being narrow front-to-back to permit angular rotation of the hopper about the base.

2. The hopper of claim 1 wherein the generally conical chamber and protrusion have a generally oblique conical shape having an elongate, open top with a nominal center offset towards the front wall of the hopper and the hopper apex at the back and bottom of the hopper.

3. The hopper of claim 1 wherein the generally conical chamber comprises:
    a cross-section of a right cone forming a back portion and having a semi-circular open top having a generally semi-circular back wall, an open front face and a bottom apex at a bottom of the open front face;
    a tetrahedron forming a front portion having an open top, an open back face, having a generally V-trough front wall and a V-trough bottom apex at a bottom of the open back face, wherein the open front face, open back face and the V-trough and open front face bottom apexes merge at the base, the base being wedge-shaped; and
    wherein the protrusion is formed in the V-trough front wall.

4. The hopper of claim 3 further comprising a substantially triangular transitional profile for merging between the open front face of the back portion and the open back face of the front portion, the transitional profile forming connecting side walls which extend along a tangent from the semi-circular back wall through the transitional profile to intersect with the V-trough front wall.

5. The hopper of claim 3 wherein the protrusion further comprises a semi-circular trough bottom.

6. The hopper of claim 3 wherein the semi-circular back wall and the front wall of the tetrahedron form the side walls of the hopper, the hopper further comprising:
    a lip formed at an upper edge of the hopper's side walls for stiffening the upper edge of the side walls.

7. The hopper of claim 6 wherein the lip comprises:
a laterally outwardly extending portion formed substantially along the upper edge of the hopper's side walls; and
a downwardly extending portion formed along the laterally extending portion,
the lip being capable of yielding and being displaced under point force.

8. The hopper of claim 7 further comprising a plurality of ribbed projections formed about an outside of a girth of the hopper for providing structural rigidity thereto.

9. The hopper of claim 1 wherein a plurality of the hopper are stackable in a nested arrangement for transport thereof.

10. A hopper for the transfer of granular materials, adapted to receive and support an inlet end of an auger in a bottom of the hopper, the hopper comprising:
a generally conical chamber having a semi-circular back wall having an open top, an open front face and a bottom apex at a bottom of the open front face; and
a tetrahedral shaped front wall having an open top, an open back face and a bottom apex at a bottom of the open back face,
wherein the open front face, open back face and the open front and back face bottom apexes merge at a wedge-shaped base for forming a composite profile adapted for receiving the inlet end of the auger at the bottom of the hopper and adapted for funneling granular material to the inlet end of the auger, the hopper being supported on the base.

11. The hopper of claim 10 wherein the front wall further comprises a protrusion for increasing an annular space between the inlet end of the auger and the hopper.

12. The hopper of claim 11 wherein the inlet end of the auger has a guard thereabout and wherein the protrusion is adapted to accommodate the guard.

13. The hopper of claim 12 wherein the protrusion further comprises a semi-circular trough bottom.

14. The hopper of claim 13 wherein the semi-circular trough bottom is adapted to have a nominal radius greater than that of the auger for forming the annular space therebetween.

15. The hopper of claim 10 wherein the base is relatively wide from side-to-side to provide lateral stability and is narrow front-to-back to permit angular rotation of the hopper angularly about the base so as to conform to the angle of the auger while maintaining the inlet end in the bottom of the hopper for maximum evacuation of the granular material from the hopper.

16. The hopper of claim 10 further comprising a transition portion for merging between the semi-circular back wall and the tetrahedral shaped front wall for forming the composite profile adapted for receiving and funneling the granular material to the inlet end of the auger regardless the angle of the auger.

17. The hopper of claim 10 wherein a bottom of the tetrahedral shaped front wall forms a front wall of the hopper.

18. The hopper of claim 17 wherein the front wall of the hopper forms an upwardly rising triangular V-trough.

19. The hopper of claim 18 wherein the transition portion further comprises:
a substantially triangular transitional profile for merging between the open front face of the semi-circular back wall and the open back face of the tetrahedral shaped front wall, the transitional profile forming connecting side walls which extend along a tangent from the semi-circular back wall through the transitional profile to intersect with side walls of the rising triangular V-trough.

20. The hopper of claim 19 wherein the connecting side walls of the semi-circular back wall and tetrahedral shaped front wall form side walls of the hopper, the hopper further comprising:
a lip formed at an upper edge of the hopper's side walls for stiffening the upper edge of the side walls.

21. The hopper of claim 20 wherein the lip comprises:
a laterally outwardly extending portion formed substantially along the upper edge of the hopper's side walls; and
a downwardly extending portion formed along the laterally extending portion, the lip being capable of yielding and being displaced under point force.

22. The hopper of claim 21 further comprising a plurality of ribbed projections formed about an outside of a girth of the hopper for providing structural rigidity thereto.

23. The hopper of claim 18 wherein the rising triangular trough further comprises a rest at an open top of the hopper adapted for conforming to the auger and supporting the auger thereon.

24. The hopper of claim 10 wherein a plurality of the hopper are stackable in a nested arrangement for transport thereof.

* * * * *